(12) United States Patent
Subramaniam

(10) Patent No.: US 10,826,682 B2
(45) Date of Patent: Nov. 3, 2020

(54) MULTI-INSTANCE ARCHITECTURE SUPPORTING TRUSTED BLOCKCHAIN-BASED NETWORK

(71) Applicant: ServiceNow, Inc., Santa Clara, CA (US)

(72) Inventor: Sreenevas Subramaniam, Dublin, CA (US)

(73) Assignee: ServiceNow, Inc., Santa Clara, CA (US)

(*) Notice: Subject to any disclaimer, the term of this patent is extended or adjusted under 35 U.S.C. 154(b) by 225 days.

(21) Appl. No.: 16/026,625

(22) Filed: Jul. 3, 2018

(65) Prior Publication Data

US 2020/0014527 A1    Jan. 9, 2020

(51) Int. Cl.
| | | |
|---|---|---|
| *H04L 9/06* | (2006.01) | |
| *H04L 9/08* | (2006.01) | |
| *H04L 9/32* | (2006.01) | |
| *G06Q 30/06* | (2012.01) | |

(52) U.S. Cl.
CPC .......... *H04L 9/0637* (2013.01); *H04L 9/0643* (2013.01); *H04L 9/085* (2013.01); *H04L 9/0825* (2013.01); *H04L 9/3247* (2013.01); *G06Q 30/0633* (2013.01); *G06Q 2220/18* (2013.01)

(58) Field of Classification Search
CPC ... H04L 9/0637; H04L 9/0643; H04L 9/0825; H04L 9/085; H04L 9/3247; H04L 63/00; H04L 9/3239; H04L 2209/38; G06Q 30/0633; G06Q 2220/18; G06Q 20/38215; G06Q 2220/00; G06F 21/10; G06F 21/64
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,609,122 B1 | 8/2003 | Ensor |

(Continued)

OTHER PUBLICATIONS

Gorog et al., "Solving Global Cybersecurity Problems by Connecting Trust using Blockchain", 2018, IEEE, pp. 1425-1432. (Year: 2018).*

(Continued)

*Primary Examiner* — Matthew Smithers
(74) *Attorney, Agent, or Firm* — Fletcher Yoder, P.C.

(57) ABSTRACT

An example embodiment performed by a scoped software application executable on a computing device of a computational instance within a trust group of computational instances of a remote network management platform may involve obtaining a representation of one or more transactions involving the computational instance. The embodiment may also involve encrypting the representation, using a pre-shared key to which at least some computational instances within the trust group have access. The embodiment may also involve placing the encrypted representation into a data block that also includes: (i) a first output generated by applying a hash function to content from a previous data block of a blockchain-based transaction ledger, and (ii) a second output generated by applying the hash function to the encrypted representation and the first output. The embodiment may also involve distributing copies of the data block to blockchain-based transaction ledgers within each computational instance of the trust group.

20 Claims, 11 Drawing Sheets

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,783,744 B2 | 8/2010 | Garg | |
| 7,877,783 B1 | 1/2011 | Cline | |
| 7,890,802 B2 | 2/2011 | Gerber | |
| 7,930,396 B2 * | 4/2011 | Trinon | G06Q 10/06 709/224 |
| 7,933,927 B2 | 4/2011 | Dee | |
| 7,941,506 B2 | 5/2011 | Bonal | |
| 7,945,860 B2 | 5/2011 | Vampenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,224,683 B2 | 7/2012 | Manos | |
| 8,266,096 B2 | 9/2012 | Navarrete | |
| 8,346,752 B2 | 1/2013 | Sirota | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,039 B2 | 2/2014 | Myers | |
| 8,674,992 B2 | 3/2014 | Poston | |
| 8,683,032 B2 | 3/2014 | Spinelli | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 * | 9/2014 | Mueller | G06F 8/65 717/121 |
| 8,887,133 B2 | 11/2014 | Behnia | |
| 8,907,988 B2 | 12/2014 | Poston | |
| 9,015,188 B2 | 4/2015 | Behne | |
| 9,037,536 B2 | 5/2015 | Vos | |
| 9,137,115 B2 | 9/2015 | Mayfield | |
| 9,182,951 B1 * | 11/2015 | Ormerod | G06F 9/4494 |
| 9,239,857 B2 | 1/2016 | Trinon | |
| 9,261,372 B2 | 2/2016 | Cline | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,659,051 B2 | 5/2017 | Hutchins | |
| 9,792,387 B2 | 10/2017 | George | |
| 9,852,165 B2 | 12/2017 | Morozov | |
| 9,967,162 B2 | 5/2018 | Spinelli | |
| 10,002,203 B2 | 6/2018 | George | |
| 10,013,573 B2 * | 7/2018 | Dillenberger | G06F 16/2379 |
| 10,063,379 B2 * | 8/2018 | Pattanaik | H04L 9/3247 |
| 2017/0116693 A1 * | 4/2017 | Rae | G06Q 20/3827 |
| 2017/0177898 A1 * | 6/2017 | Dillenberger | G06F 16/2379 |
| 2018/0005186 A1 * | 1/2018 | Hunn | G06F 40/103 |
| 2018/0089758 A1 | 3/2018 | Stradling et al. | |
| 2018/0276597 A1 * | 9/2018 | Fuller | G06Q 10/087 |
| 2019/0036957 A1 * | 1/2019 | Smith | H04L 9/3239 |
| 2019/0303121 A1 * | 10/2019 | Padmanabhan | G06F 16/27 |
| 2019/0340269 A1 * | 11/2019 | Biernat | G05B 19/4093 |

OTHER PUBLICATIONS

Extended European Search Report for European Patent Application No. 19183952.1 dated Nov. 25, 2019; 9 pgs.
A Beginner's Guide to Blockchain, Hacker Noon, 10 pages.
Introduction to Blockchains, John Kelsey, NIST, 37 pages.
"Here's how I built a private blockchain network, and you can too", Abhishek Chakravarty, Sep. 4, 2017, 15 pages.
"How Do Ethereum Smart Contracts Work?", Coindesk, 5 pages.

* cited by examiner

US 10,826,682 B2

MULTI-INSTANCE ARCHITECTURE SUPPORTING TRUSTED BLOCKCHAIN-BASED NETWORK

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform.

Furthermore, the remote network management platform may have a multi-instance architecture that provides each enterprise with its own database in a dedicated computing instance. This prevents comingling of enterprise data and allows each instance to be independently managed. For example, when one enterprise's instance experiences an outage due to errors or an upgrade, other computational instances are not impacted.

SUMMARY

The present disclosure provides a remote network management platform that implements improved methods and systems for recording data at computational instances and sharing data between computational instances. In particular, the remote network management platform can be configured to integrate blockchain-based distributed ledger technology with the remote network management platform's multi-instance architecture to enable enterprises to store and share, with other trusted enterprise customers that use the remote network management platform, data related to transactions (e.g., license agreements, loans, purchase orders) involving the enterprise. To facilitate this, the distributed ledger can be distributed and stored across only a trusted network of computational instances of the remote network management platform.

Accordingly, a first example embodiment may involve obtaining, by a scoped software application, a representation of one or more transactions involving the computational instance. The scoped software application may be executable on a computing device of a computational instance. The computational instance may be one of a plurality of computational instances disposed within a remote network management platform, each of which may be communicatively coupled and dedicated to a respective managed network. The managed networks may be controlled by respectively different entities. A subset of the computational instances may form a trust group and at least some of the computational instances in the trust group may have access to a pre-shared key. The computational instance may be within the trust group.

The first example embodiment may also involve encrypting, by the scoped software application, using the pre-shared key, the representation of the one or more transactions. The first example embodiment may also involve placing, by the scoped software application, the encrypted representation into a data block that also includes: (i) a first output generated by applying a hash function to content from a previous data block of a blockchain-based transaction ledger, and (ii) a second output generated by applying the hash function to the encrypted representation and the first output. The first example embodiment may also involve distributing, by the scoped software application, copies of the data block to blockchain-based transaction ledgers within each computational instance of the trust group.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
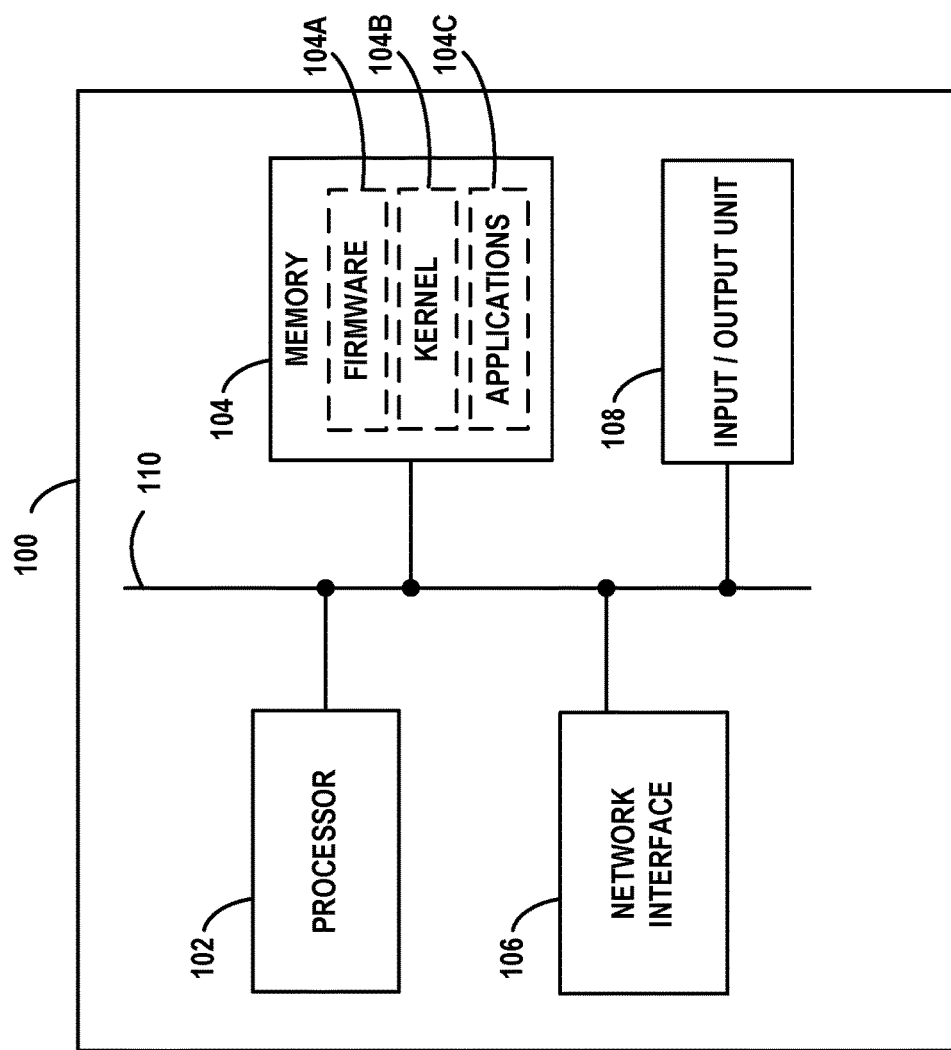
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality.

Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
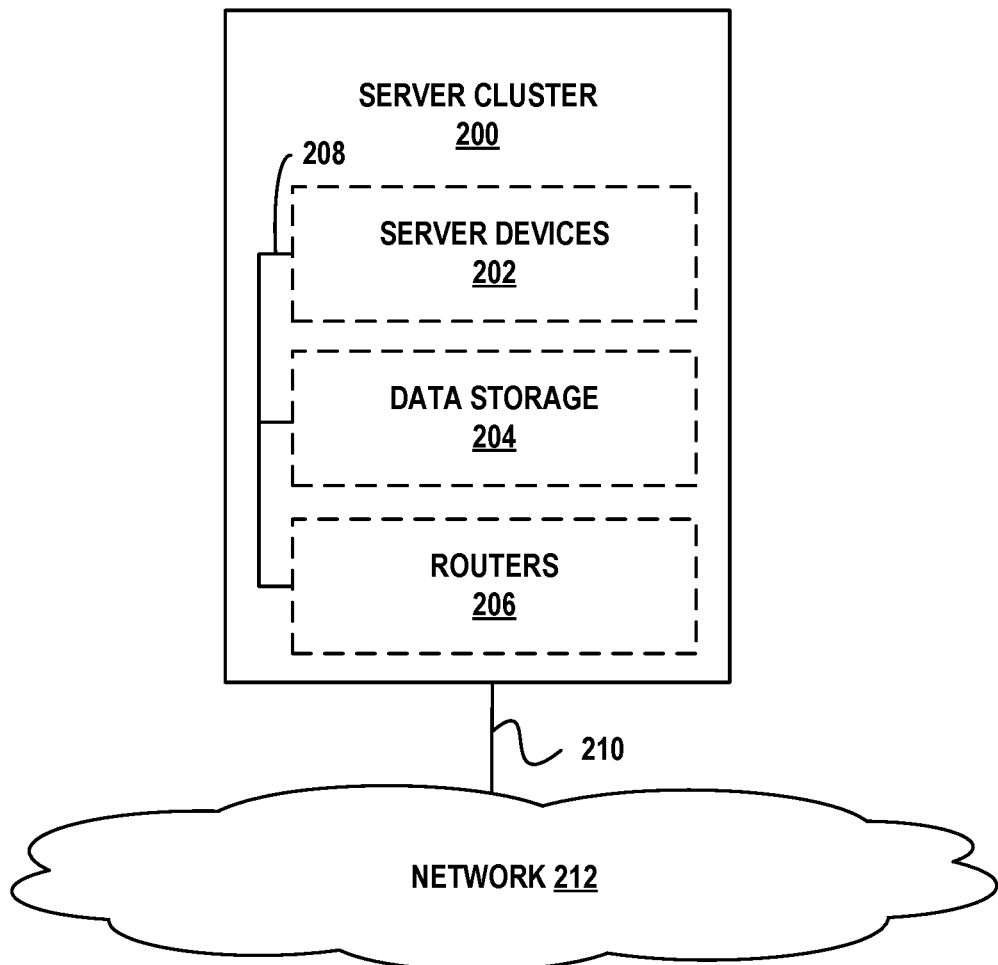
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
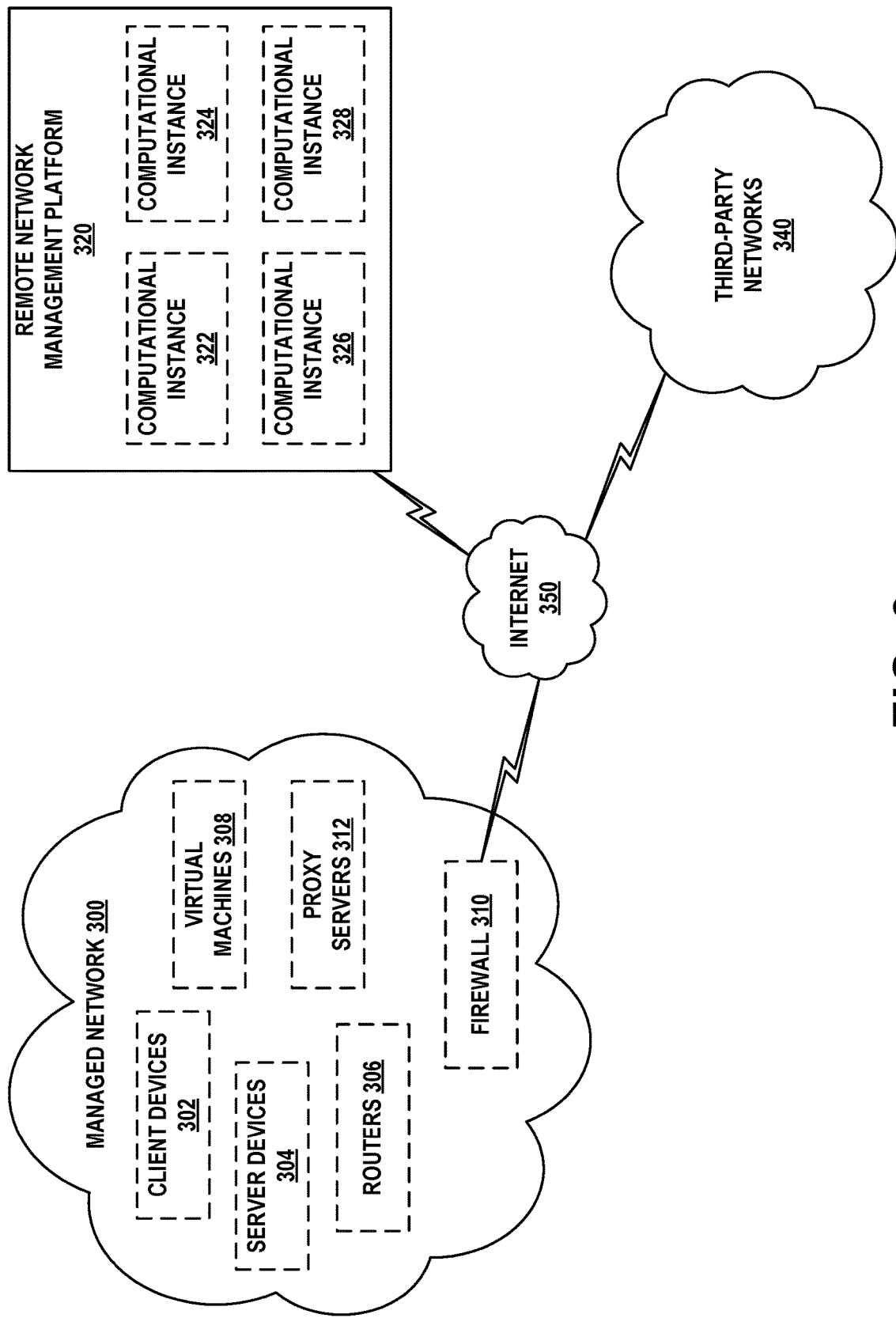
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
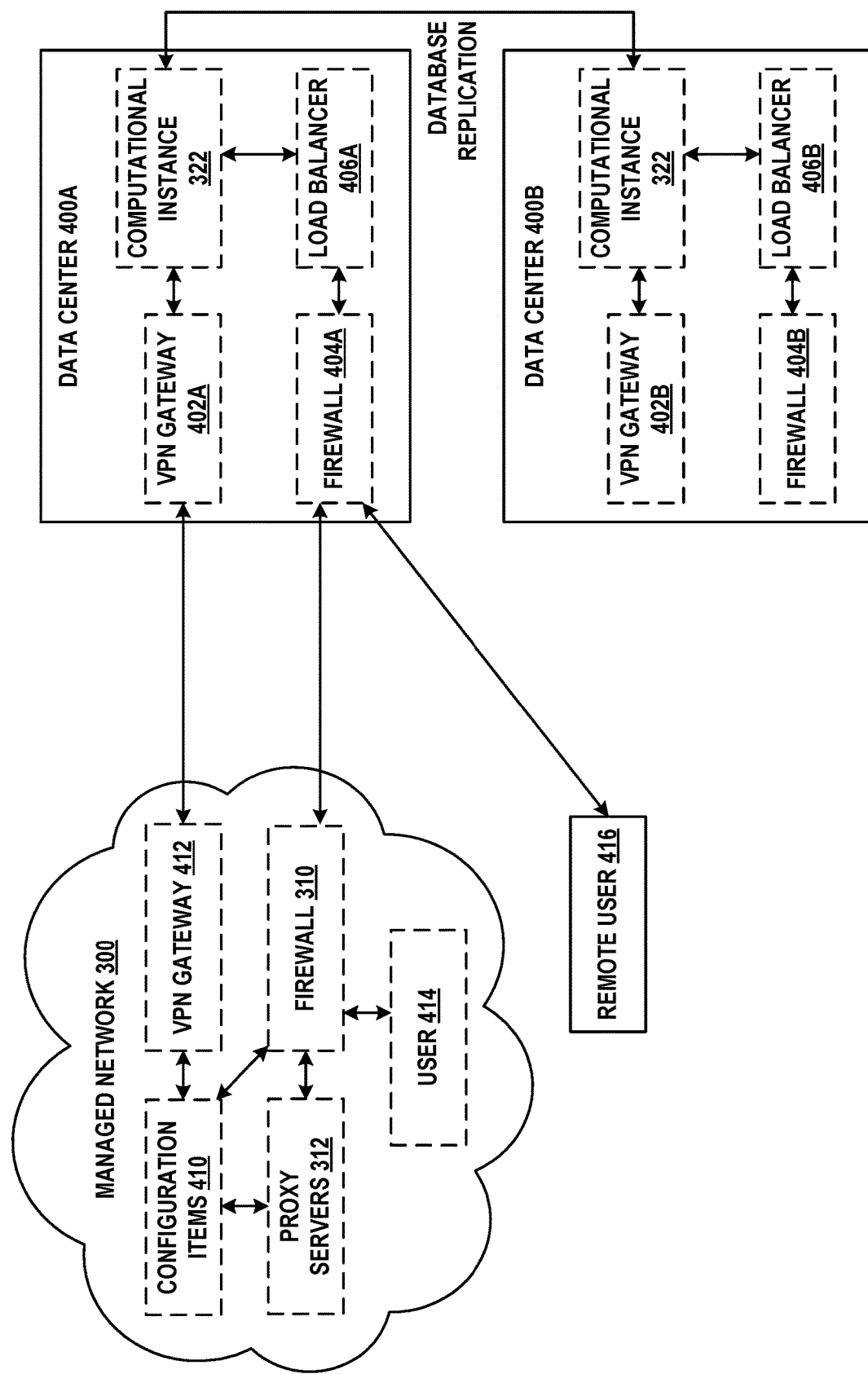
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
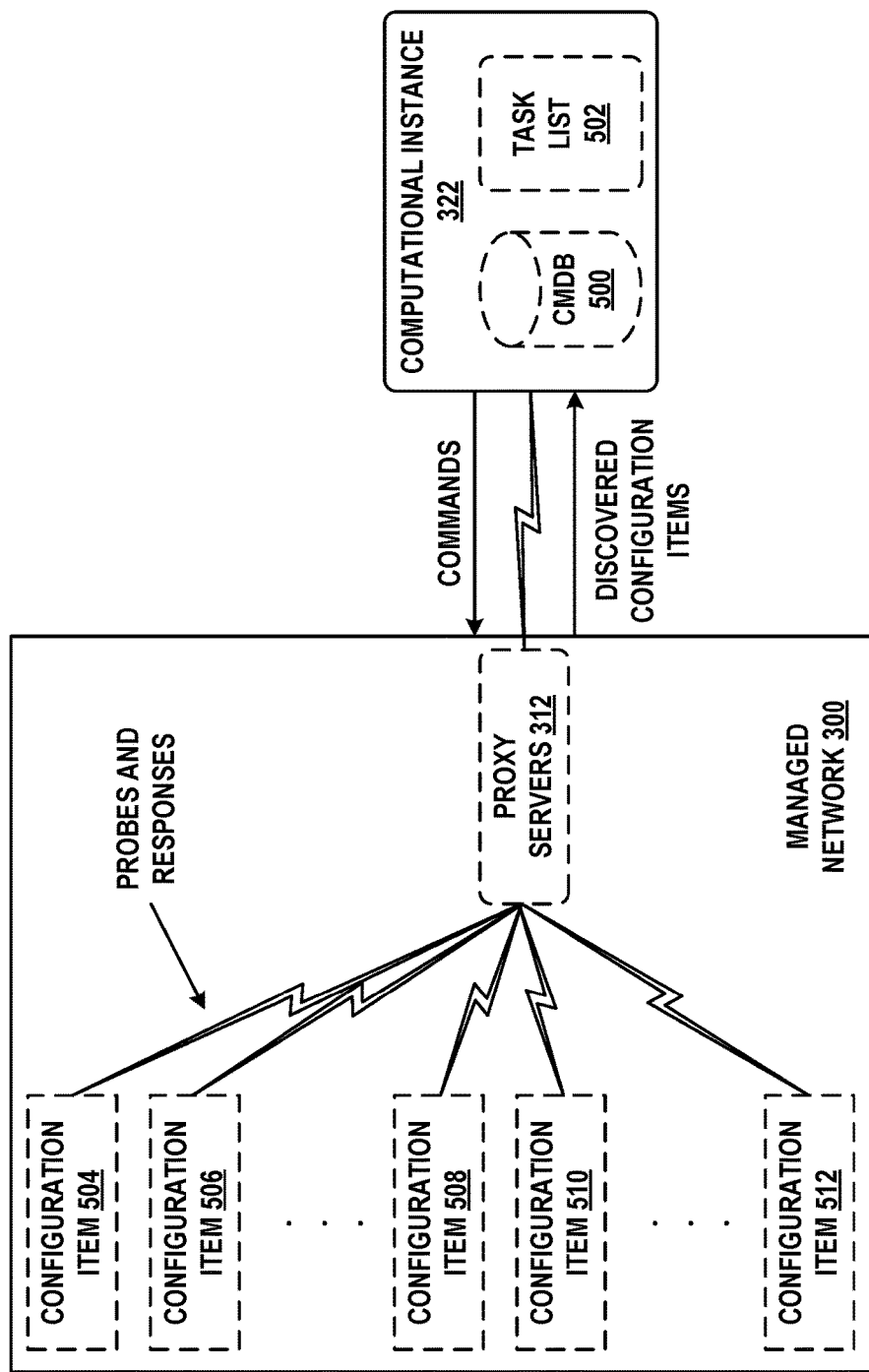
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
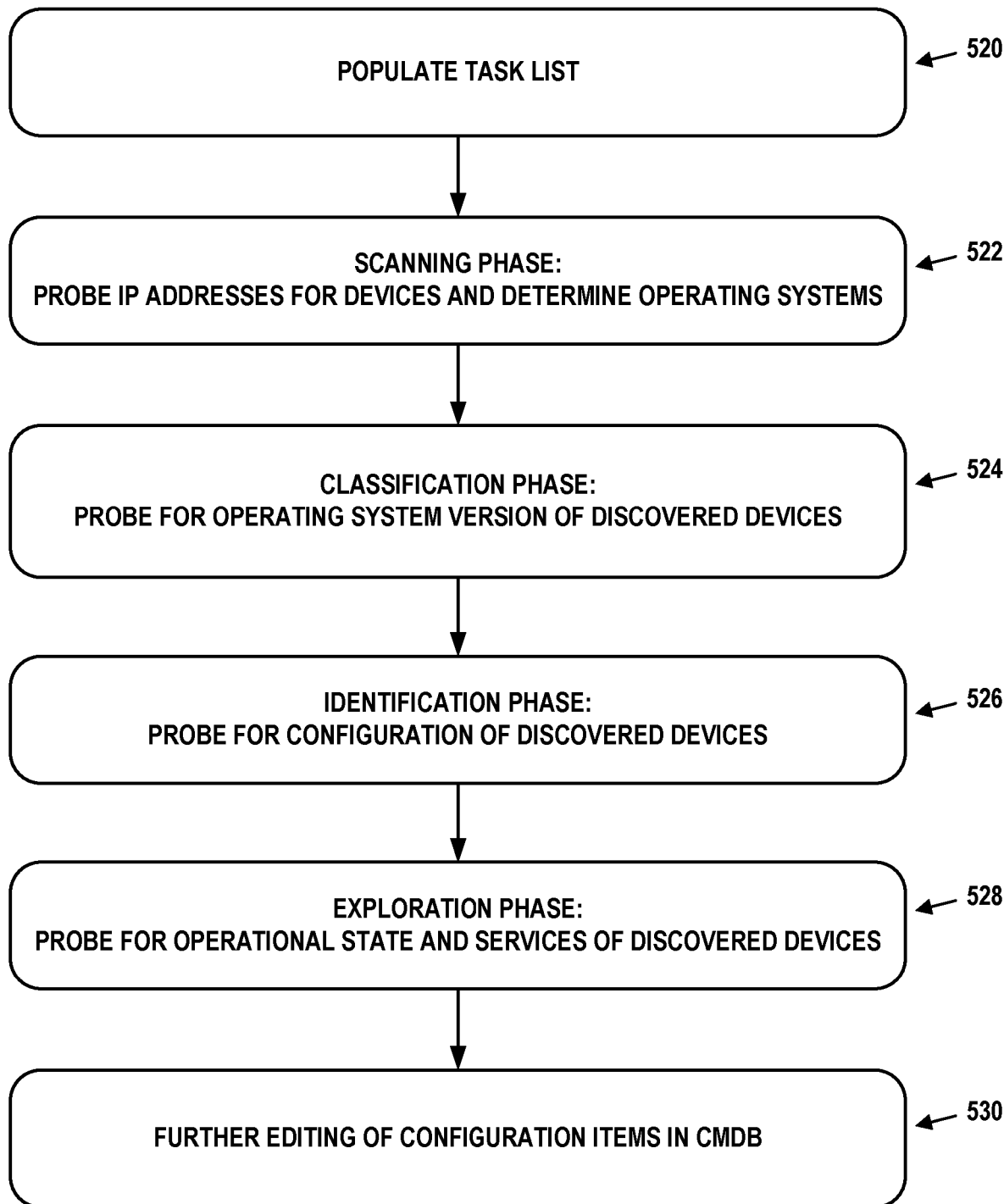
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Distributed Ledger and Blockchain Operations

Various forms of data can be stored in a distributed ledger supported and maintained by an organized peer-to-peer network of two or more nodes, where each such node is a computing device capable of data storage. In particular, a distributed ledger can be a decentralized data structure in which records of data are distributed among the network of nodes such that each node stores a copy of the records of data, thereby making such records transparent to each node with access to the distributed ledger, meaning that the records are open to viewing by each node with access. A distributed ledger is thus effectively a database that is consensually shared and synchronized across the peer-to-peer network.

An example form of a distributed ledger is one that implements a particular data structure referred to as a "blockchain." Such a distributed ledger may be referred to herein as a "blockchain-based ledger" or a "blockchain-based transaction ledger."

A blockchain data structure can provide data security and consistency among the network of nodes that support and maintain the distributed ledger. In particular, a blockchain can include a plurality of "blocks" (also referred to herein as "data blocks"), and each block can include a single record of data or a group of records of data. The blocks of a blockchain are linked together in sequence by way of a hash chain structure, in which each block of the blockchain (other than the block that originates the blockchain) includes a header representing a hash value (or "hash") of a block that precedes the block in the blockchain, and also includes a hash value of the block. In particular, the hash value of the block itself can be a hash of all the content in the block (including all records in the block and the hash value of the preceding block) except the hash itself. Further, a block of a blockchain can either be an origin block originating the blockchain (which can include a hash of the origin block) or a block that includes both a hash of a parent block prior to the block in the blockchain and a hash of the block itself. The hash of the parent block links the block with the parent block, which in turn is linked to another parent block, and so on back to the origin block.

In some blockchain implementations, a blockchain may implement a hash tree, such as a Merkle tree, within one or more blocks of the blockchain. A Merkle tree, for instance, can produce a digital fingerprint the record(s) included in a given block, which can enable a user to verify whether a certain record is included in the block. In particular, each leaf node of the Merkle tree can be a hash of a record, and each non-leaf node can be a hash of previous hashes. Hashing continues until a root hash node is generated. For example, if a block contains four records, Records 1, 2, 3, and 4, each record can be hashed to generate a respective leaf node. Two of the resulting four leaf nodes can be hashed to form a first non-leaf node, and the remaining two of the four leaf nodes can be hashed to form a second non-leaf node. The first and second non-leaf nodes can then be hashed to form a root hash node. Other examples are possible. Because the nodes are related in this way, a Merkle tree can thus be used to quickly identify a record in a block that caused a hash failure, which might indicate that the record has been tampered with and is corrupt. In this manner, a Merkle tree or other hash tree can be used to detect corruption of data stored in blocks in the blockchain.

The hash chain structure and the distributed nature of a blockchain provide various advantages. For example, because all blocks but the origin block can include a hash of a parent block, a modification of the data of a given block would involve modifying the hash value stored in a later block which in turn would modify the hash value of an even later block, and so on. As such, the hash chain structure of the blockchain protects data stored in the blockchain from tampering. Further, by having each node of the network of nodes store and maintain a copy of the blockchain, any node of the network of nodes can detect when an unauthorized alteration of data stored in the blockchain occurs. (However, in scenarios where a majority of the copies of the blockchain are corrupted, unauthorized alteration might not be detected, or might not be as easily detected. But because the present disclosure involves copies of the blockchain being present on a network of trusted nodes, the likelihood that a majority of the copies would become corrupted can be reduced.)

In some implementations, to facilitate the blockchain-based operations discussed above, the network of nodes that support and maintain the blockchain-based distributed ledger can use a common protocol for creating, distributing, and validating new blocks in the blockchain-based distributed ledger, which can further help provide transparency (i.e., making blocks viewable by all nodes with access), as well as data security and consistency. In some implementations, the common protocol can include the use of digital signatures for verifying the source of a new block in the blockchain-based distributed ledger. For example, when a node adds a new block, the node can sign the new block with the node's private key, after which each other node with access to the node's public key that is associated with the private key can verify that the new block was added by the node. Further, the use of digital signatures allows non-repudiation in the sense that, because the new block has the node's digital signature, the node cannot deny having added the new block. (Public and private keys are discussed in more detail in the following section.)

Furthermore, by providing transparency and security in the manners discussed above, blockchain promotes accountability among a network of nodes, as each such node can be responsible for maintaining the integrity of the blockchain.

VI. Example Integration of a Blockchain-Based Ledger with a Remote Network Management Platform An enterprise using remote network management platform 320 may at times engage in transactions with another party who uses the remote network management platform 320. Herein, a "transaction" refers to any action involving an exchange of resources, such as money, services, or data, between two or more entities and/or involving a formal agreement (e.g., a signed contract) between two or more parties. As an example, when an enterprise seeks to acquire or extend a software license for a particular software, the enterprise can engage in a transaction with a publisher of the software to purchase a software license from the publisher and thus create a software entitlement contract between the enterprise and the publisher. As another example, an enterprise such as a banking company can issue a loan to a customer of the banking company. As yet another example, an enterprise such as a hospital or clinic can provide medical services to a patient. And as another example, an enterprise can purchase insurance from an insurance provider. Other examples are possible as well.

The remote network management platform 320 can provide an enterprise with services that enable the enterprise to manage data associated with a transaction. This transaction data can take various forms, such as a spreadsheet or PDF document, and can specify the nature of the transaction, parties involved in the transaction, terms and conditions of the transaction, resources exchanged or shared as part of the transaction, and/or other information relevant to the transaction. These services may be provided through higher-level software applications hosted by the remote network management platform 320 and deployed within or involving a computational instance (e.g., computational instance 322). An example of such a service may be a software asset management application, which enables an enterprise to determine which hardware and software components are being used to support certain enterprise operations. As a more particular example, an enterprise can use the software asset management application to store and manage transaction data for software entitlement contracts to which the enterprise is a party. Another example service may be an enterprise management application, which the enterprise can use to manage the enterprise's accounts and record transactions. Other examples are possible as well.

In some implementations, these or different services can also enable the enterprise to share transaction data with another party or parties, such as by transmitting transaction data to another party over a network or giving another party permission to locally or remotely access the transaction data stored at the enterprise's data center. As an example, an enterprise might give an auditor (e.g., an accounting firm) access to records of one or more of the enterprise's transactions for the auditor to review. As another example, an enterprise might send enterprise or employee identification information to an insurance provider. And as another example, a health care institution such as a hospital or clinic might send patient information with a health insurance provider and/or might send patient records to another health care institution, such as when a patient changes doctors or otherwise seeks alternate medical care. Other examples are possible as well.

In any event, it can be important for an enterprise to be able to efficiently, accurately, and securely keep track of its transactions, record transaction data, and/or share transaction data with other parties. This can be even more important when the enterprise has numerous transactions (e.g., hundreds) to manage, at least some of which could be complex in nature and/or involve large quantities of transaction data.

Accordingly, the present disclosure provides an improved remote network management platform that supports recording and sharing of transaction data in a blockchain-based ledger distributed among a network of two or more trusted parties who use the remote network management platform. In particular, a computational instance of the remote network management platform can run a software application that is configured to enable an enterprise associated with the computational instance to create or join a "trust group" including two or more computational instances that support and maintain the blockchain-based ledger. Each member of the trust group can be an entity, such as the enterprise, to whom a computational instance of the remote network management platform 320 is dedicated, and whom other members trust to serve as a node that stores a copy of the blockchain-based ledger. The software application can also be configured to enable the enterprise to add transaction data in the blockchain-based ledger so that members of the trust group can view the transaction data.

The act of storing (or, phrased another way, "adding" or "recording") transaction data to the blockchain-based ledger can involve the act of distributing copies of the transaction data (or, more particularly, copies of a block containing the transaction data) to each computational instance the trust group. Thus, the acts of storing, adding, recording, and distributing copies of transaction data may be referred to interchangeably herein.

The software application described above may be referred to herein as a "scoped" application. As a general matter, a scoped application may be an application developed using a particular application programming interface (API) provided by the remote network management platform 320 and customized for a particular purpose. A scoped application can be developed and/or customized by an entity that controls the remote network management platform 320 or by a customer of the remote network management platform 320. Further, a scoped application may have access rules, perhaps in the form of an access control list (ACL), that define which users (e.g., enterprises, or employees thereof, with an administrative role) and/or other applications are allowed to access the scoped application and/or its data.

In the context of the present disclosure, the software application may be a scoped application that is designed to leverage blockchain protocols and enable members of the trust group to store transaction data in the blockchain-based ledger. In particular, the remote network management platform 320 can provide an API that facilitates sharing transaction data in a blockchain-based ledger with the trust group, and the scoped application can be designed and implemented using the API. In some implementations, the scoped application can take the form of an existing software application provided by the remote network management platform 320, such as a software assert management application, with which blockchain-based functionality is integrated. Additionally or alternatively, the scoped application can be a separate, distinct application that enterprises can access to create a trust group (or join an existing trust group) and share transaction data within the trust group.

Further, the scoped application may be specifically customized such that members of the trust group can use the scoped application to store a pre-defined type of data. As an example, an enterprise member of the trust group can customize a particular scoped application such that the scoped application enables the enterprise and other members of the trust group to store in the blockchain-based ledger transaction data related to contracts. In other examples, the scoped application might be customized to enable members of the trust group to select which of a variety of types of transaction data the members would like to store in the blockchain-based ledger. Scoped applications can be customized in other ways as well.

Implementations of this disclosure provide technological improvements that are particular to computer networks and computing systems. For example, implementations leverage and combine both the above-described advantages of blockchain, such as transparency and data security/consistency, as well as the advantages of the multi-instance architecture of remote network management platform 320.

Computing system-specific technological problems, such as inefficiency, unreliability, and complexity that can accompany the use of computer technology in managing transaction data, can be wholly or partially solved by the implementations of this disclosure. For example, implementations of this disclosure provide a unified, secure, reliable, and trusted environment in which multiple parties can manage transaction data in a decentralized manner. Further, implementations of this disclosure can reduce the time spent completing transactions, managing transaction data, and sharing transaction data, and can provide trust groups and individual enterprises with the tools to customize how transaction data is managed within each enterprise and shared with other enterprises.

These and other improvements are described in more detail below, though the operations described below are for purposes of example and that implementations may provide other improvements as well.

As noted above, the scoped application can enable an enterprise to create a custom trust group or join an existing trust group. A trust group can be defined by the enterprise (e.g., by a user of the enterprise with administrative privileges) that creates the trust group, or could be defined by an administrator entity that controls the remote network management platform 320. One or more members of the trust group, such as the enterprise that created the trust group, can be given the authority to grant permission for other members to be added into the trust group. Additionally or alternatively, the administrator entity that controls the remote network management platform 320 can be given the authority to grant permission for members to be added into the trust group.

A trust group can be defined to include members that meet certain criteria. For example, a trust group can include enterprises spread across multiple different industries (e.g., finance, manufacturing, health care, software). Alternatively, a trust group can include enterprises all in the same industry, such as a trust group created by a group of software publishers with similar customer bases. Trust groups can be defined based on other criteria as well. For example, a trust group can include only public companies, or can include only private companies. As another example, a trust group can include any entity (e.g., of any size, industry, etc.) that is trusted by other members in the trust group. Other examples are possible as well.

Figure 6:
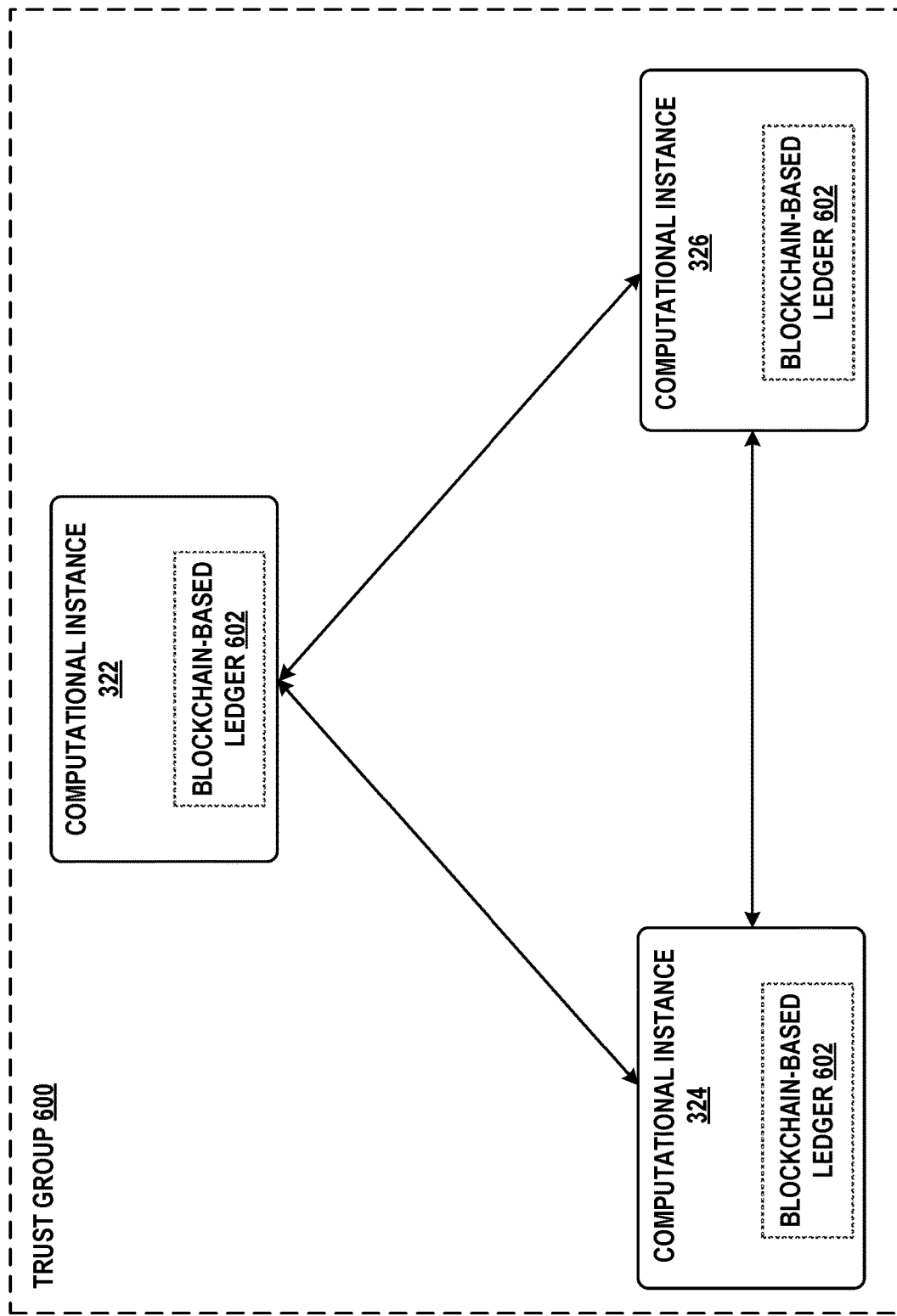
FIG. 6 depicts a trust group of computational instances, in accordance with example embodiments.

FIG. 6 depicts an example trust group 600. Each member of the trust group 600 is represented by a respective computational instance, such as computational instances 322, 324, and 326. The trust group 600 can take the form of a peer-to-peer network comprising each of the computational instances 322, 324, and 326. A blockchain-based ledger 602 may be replicated across computational instances 322, 324, and 326, meaning that a copy of the blockchain-based ledger 602 is stored at each computational instance. The term "blockchain-based ledger" may thus also be used herein to refer to each computational instance's respective blockchain-based ledger.

Adding transaction data in the blockchain-based ledger can be performed using a pre-shared key. In particular, when a member of the trust group 600 adds transaction data to the blockchain-based ledger 602, the scoped application can encrypt the transaction data using the pre-shared key, after which the scoped application can include the encrypted transaction data in a block and add the block to the blockchain-based ledger 602.

In some implementations, the pre-shared key may be a public key of a trust group member's asymmetric key pair. An asymmetric key pair can refer to a pair of keys—a public key and a private key—that are mathematically associated to each other and that can be used for authentication and encryption purposes.

Authentication, for instance, can be accomplished through use of digital signatures. Consider for example a message represented by the letter M. (M could represent other data as well, such as transaction data.) When a private key of a key pair is used on the message, a digital signature, S, can be generated, as shown in Equation 1 below. Then, when a public key of the same key pair is used on the digital signature, the message can be generated. This is represented by Equation 2 below.

$$\text{Private}(M) = S \quad \text{Equation (1)}$$

$$\text{Public}(S) = M \quad \text{Equation (2)}$$

Thus, when a first party sends (or records, or shares, etc.) a message, the first party can sign the message with the first party's private key, which generates a digital signature. Then, a second party with access to the first party's public key can use that public key on the digital signature to generate the message and thus verify that the digital signature on the message was performed using the first party's private key.

As for encryption purposes, when a public key of the key pair is used on the message, an encrypted representation, C, of the message can be generated. This is shown in Equation 3 below. The encrypted representation can take the form of cypher text or can take other forms. Then, when a private key of the same key pair is used on the encrypted representation, the encrypted representation is decrypted using the private key and thus the message can be generated. This is shown in Equation 4 below.

$$\text{Public}(M)=C \qquad \text{Equation (3)}$$

$$\text{Private}(C)=M \qquad \text{Equation (4)}$$

Thus, when a first party seeks to share the message with a second party, for example, the first party can encrypt the message with the second party's public key (assuming the first party has access to the second party's public key), which generates the encrypted representation of the message. Then, upon receipt of the encrypted representation, the second party can use the second party's private key to decrypt the message.

Similarly, when a private key of the key pair is used on the message, an encrypted representation, C, of the message can be generated. This is shown in Equation 5 below. Then, when a public key of the same key pair is used on the encrypted representation, the encrypted representation is decrypted using the public key and thus the message can be generated. This is shown in Equation 6 below.

$$\text{Private}(M)=C \qquad \text{Equation (5)}$$

$$\text{Public}(C)=M \qquad \text{Equation (6)}$$

Thus, when a first party seeks to share the message with a second party, for example, the first party could encrypt the message with the first party's private key, which generates the encrypted representation of the message. Then, upon receipt of the encrypted representation, the second party can use the first party's public key to decrypt the message (assuming the second party has access to the first party's public key).

Asymmetric encryption can also be represented as shown in Equations 7 and 8 below.

$$\text{Public}(\text{Private}(M))=M \qquad \text{Equation (7)}$$

$$\text{Private}(\text{Public}(M))=M \qquad \text{Equation (8)}$$

In some implementations, the same asymmetric key pair can be used for both digital signatures and encryption. In other implementations, a party might have two asymmetric key pairs associated with the party: one for digital signatures and one for encryption.

In line with the discussion above, at some point in time, such as when an enterprise joins the trust group 600 or registers with the remote network management platform 320, an asymmetric key pair can be generated for the enterprise and the enterprise's public key can be made accessible to at least some of the members of the trust group 600—namely, members that are granted permission to access the public key (which, in some scenarios, may be all members of the trust group 600). This generated asymmetric key pair can be a key pair that is used only with respect to the blockchain-based ledger 602. The private key of the asymmetric key pair can be stored at a computational instance of the enterprise such that only the enterprise can access and use the private key. Whereas the public key can be stored at a central computational instance managed by the remote network management platform 320, or perhaps at another location, and can be made accessible to at least some of the members of the trust group 600. The central computational instance might or might not be included in the trust group 600. In some examples, upon creation of the trust group 600, the central computational instance might be added to the trust group 600 by default. In these and other examples, the central computational instance might serve as a certificate authority configured to perform various operations such as generating an asymmetric key pair for a member of the trust group 600 when the member joins/creates the trust group 600 and/or receiving, from the enterprise's computational instance, a request from the enterprise to give another member access to the enterprise's public key. The central computational instance can be configured to perform other operations as well.

A member with access to the enterprise's public key can encrypt transaction data using the public key and add the transaction data to the blockchain-based ledger 602, and then the enterprise can decrypt the blockchain-based ledger 602 using the private key to view the transaction data. In addition, the enterprise can use the private key to sign a block containing transaction data, and a member with access to the public key can then use the public key to view the signature and thus verify that the enterprise has signed the transaction data. For example, the scoped application can generate a digital signature using the enterprise's private key, where the digital signature uniquely identifies the enterprise. The scoped application can then include the digital signature with the transaction data before encrypting the transaction data (and thus, the digital signature) with the public key.

In some implementations, the pre-shared key may be a symmetric key dedicated for use in both encrypting and decrypting transaction data that is placed into the blockchain-based ledger 602. In contrast to the asymmetric encryption described above, symmetric encryption typically does not involve use of a key pair, but rather involves use of a single, private key to which only authorized parties have access. Members with access to the symmetric key can encrypt and decrypt transaction data in the blockchain-based ledger 602.

When the trust group 600 is created, the symmetric key can be created as well. The symmetric key can be stored at the central computational instance managed by the remote network management platform 320 and/or copies of the symmetric key can be stored at each computational instance when the computational instance has access to the symmetric key. Alternatively, the pre-shared key can take the form of a symmetric key, and each member of the trust group 600 can additionally have an asymmetric key pair used for signing transaction data and verifying such signatures. Each member's public key of the member's respective asymmetric key pair can be accessible by at least some of the other members, as discussed above, and each member can use its respective private key to sign the transaction data before encrypting the transaction data and placing the transaction data in the blockchain-based ledger 602.

Regardless of whether the pre-shared key is an symmetric key or a public key of an asymmetric key pair, the pre-shared key can advantageously serve as a way to restrict access the blockchain-based ledger 602 to only trusted individuals and enterprises who have access to the pre-shared key. The pre-shared key, considered in conjunction with the secure nature of blockchain technology discussed above, can protect transaction data in the blockchain-based ledger 602 from being viewed or tampered with by non-trusted entities. Further, by giving trusted entities access to the pre-shared key within the trust group 600, transparency and trust is promoted, since each trusted entity with access to the pre-shared key can view the blockchain-based ledger 602.

In any implementation, at least some of the computational instances of the trust group 600 may have access to the pre-shared key at a given time. In some scenarios, for example, every computational instance within the trust group 600 may have access to the pre-shared key at a given time. However, in other scenarios, only some computational instances of the trust group 600 may have access to the pre-shared key at a given time. For example, at a first point in time, computational instances 322 and 324 may have access to the pre-shared key, but computational instance 326 may not have access to the pre-shared key. Later, at a second point in time, computational instance 326 may be granted permission to access the pre-shared key, such that all three computational instances of the trust group 600 have access to the pre-shared key. As another example, at a first point in time, computational instances 322 and 324 may have access to the pre-shared key, but computational instance 326 may not have access to the pre-shared key. Later, at a second point in time, computational instance 326 may be granted permission to access the pre-shared key, but computational instance 324 may be denied permission to access the pre-shared key, such that only computational instances 322 and 326 have access to the pre-shared key. Other examples are possible as well.

Thus, although each computational instance in the trust group 600 stores a respective copy of the blockchain-based ledger 602 at a given time, there may be times at which only some of the computational instances in the trust group 600 will have the ability to add new transaction data to the blockchain-based ledger 602 and/or to view the transaction data in the blockchain-based ledger 602.

When a new member joins the trust group 600, a copy of the blockchain-based ledger 602 can be stored at that member's computational instance, although in some implementations, the new member might not be able to view historical transaction data (i.e., at least a portion of the transaction data that was stored in the blockchain-based ledger 602 before the new member joined). In other implementations, the new member might be able to access the historical transaction data upon joining the trust group 600. To facilitate this, for example, the new member may receive permission to access a copy of the blockchain-based ledger 602, upon which a data copy transaction workflow can be initiated, which can create a copy of the historical transaction data (e.g., a copy of all of the transaction data currently in the blockchain-based ledger 602), after which the copy can be stored at the new member's computational instance. Permission can be granted by the certificate authority (e.g., the central computational instance), by a majority (e.g., more than half) of the trust group 600 members, or by a unanimous agreement by the trust group 600 members. Other examples are possible as well.

In some implementations, one or more members of the trust group 600 may have administrator permissions for enabling and disabling a given computational instance's access to the pre-shared key. In such implementations, the scoped application may provide an interface for enabling the member(s) with administrator permissions to control which computational instances in the trust group 600 have access to the pre-shared key. Additionally or alternatively, an entity outside of the trust group 600, such as an administrator entity that controls the remote network management platform 320, can have such administrator permissions for enabling and disabling a given computational instance's access to the pre-shared key.

Further, in some implementations, one or more members of the trust group 600 may have administrator permissions for controlling which members can read (i.e., view) the blockchain-based ledger 602 and controlling which members can write (i.e., add) a block of transaction data to the blockchain-based ledger 602. In an example scenario, all members of the trust group 600 may have permission to view the blockchain-based ledger 602, but only one member may have permission to write a block to the blockchain-based ledger 602. Other examples are possible as well. In any event, when a member of the trust group 600 writes a block to the blockchain-based ledger 602, the remote network management platform 320, through the scoped application, can distribute copies of the block to at least some of the members of the trust group 600.

Hereinafter, the act of distributing copies of a block will be described as involving distributing copies of the block to all members of the trust group 600. In some scenarios, however, a copy of the block might not be distributed to one or more members.

In an example implementation, the act of controlling a member of the trust group 600 to be able to write a block of transaction data to the blockchain-based ledger 602 can involve adding an identifier of the member (and thereby, an identifier a computational instance associated therewith) to a list of identifiers of members with permissions to write blocks to the blockchain-based ledger 602. Thereafter, when a server or other computing device that is controlled by the remote network management platform 320 and that hosts the scoped application receives input data representing a request to write a block to the blockchain-based ledger 602, the remote network management platform 320 can check an identifier of the computational instance from which the request was received against the list. If the list includes the identifier of the computational instance, the remote network management platform 320 will accept the request.

Figure 7:
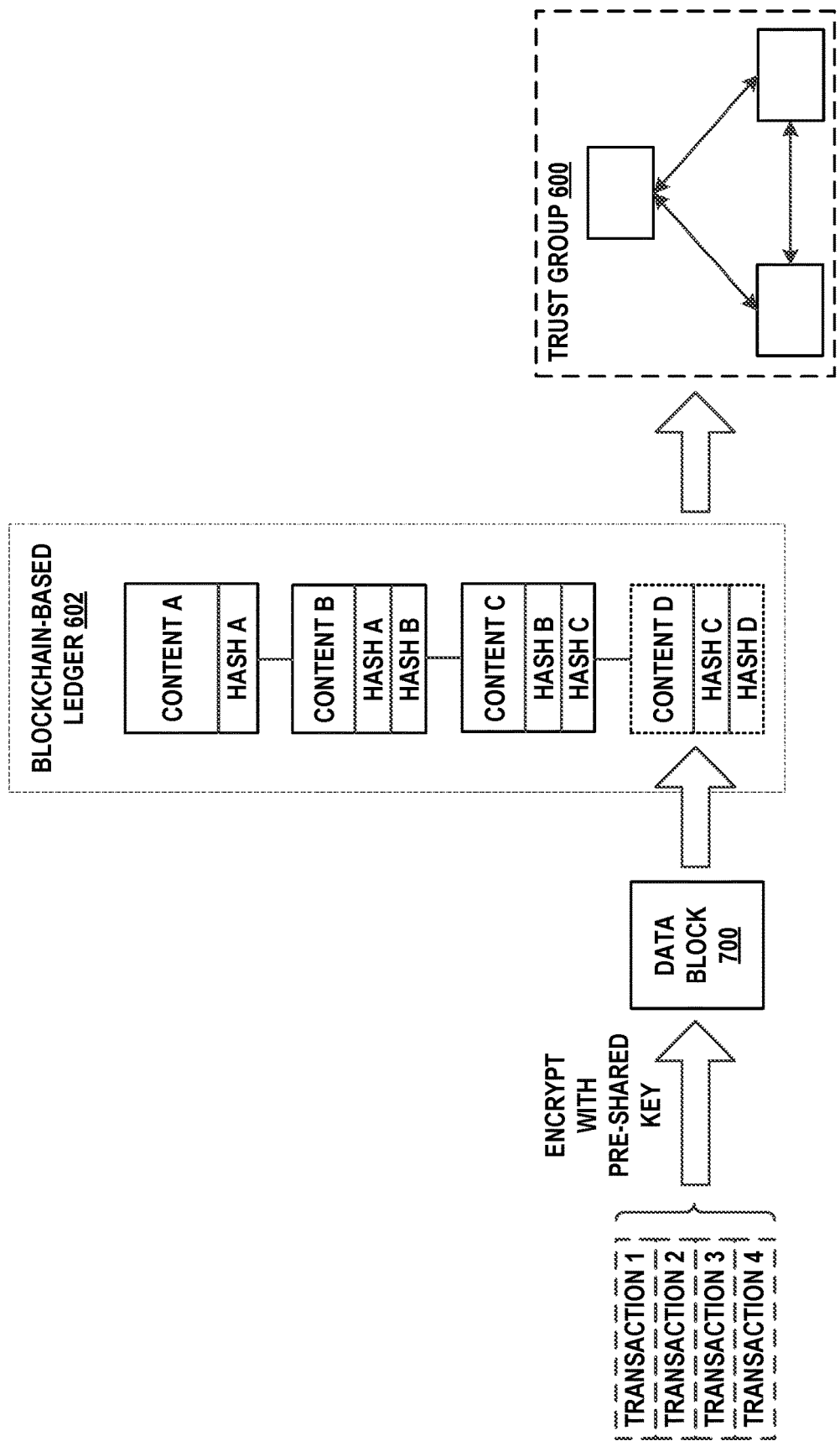
FIG. 7 illustrates an example process for adding transaction data to a blockchain-based ledger, in accordance with example embodiments.

FIG. 7 illustrates an example process for adding transaction data to the blockchain-based ledger 602 shared by the trust group 600 shown in FIG. 6. For the purposes of example, the process will be described with respect to computational instance 322 and an enterprise that controls computational instance 322. In particular, the process can be carried out by a scoped application executable on a computing device of computational instance 322.

In some implementations, the process can involve obtaining a representation of one or more transactions involving computational instance 322 or, more particularly, involving the enterprise. Herein, a representation of one or more transactions involving a given computational instance can be referred to as "transaction data," in line with the discussion above.

A representation of a given transaction can take various digital forms. For example, the representation can include text, images, and/or other types of data that indicate one or more portions of the transaction, such as the terms and conditions of the transaction, a quantity of money or other resource exchanged as part of the transaction, and/or the parties involved in the transaction, among other possibilities. As a more particular example, the representation can include a PDF document, such as a PDF of a contract between the enterprise and another enterprise, and/or a spreadsheet that includes text and/or other data from such a contract or other transaction. Other examples are possible as well.

In some implementations, the scoped application can enable the enterprise to upload or otherwise specify which transaction data to add to the blockchain-based ledger 602. For example, the enterprise can choose to add contracts to the blockchain-based ledger 602, but not to add incident records. As another example, the enterprise can choose to add records of at least some transactions between the enterprise and a first party, but not to add records of transactions between the enterprise and a second, different party. Other examples are possible as well.

In some implementations, the scoped application can provide an interface that enables the enterprise to engage in transactions with another party, such as another member of the trust group 600. For example, two members of the trust group 600, such as the enterprise and a software publisher, can access the scoped application via their respective computational instances and use the interface to specify terms and conditions to generate a software entitlement contract. Other examples are possible as well. In some implementations, the scoped application can be configured to store transaction data related to the transaction once the transaction has been completed via the interface.

In some implementations, the quantity of transactions that can be included per-block can be customizable by the enterprise, another member of the trust group 600, and/or by an entity that controls the remote network management platform 320. Further, in some examples, the scoped application can be configured to include the same number of transactions in each block, whereas in other examples the scoped application can be configured to include varying numbers of transactions in the blocks.

In some implementations, multiple different asymmetric key pairs and/or multiple symmetric keys can be generated (e.g., by a certificate authority or by another entity) and each key pair or key can be dedicated for a particular use. For example, a first key pair can be dedicated for use in viewing a first set of one or more blocks of the blockchain-based ledger 602 and a second, different key pair can be dedicated for use in viewing a second, different set of one or more blocks of the blockchain-based ledger 602. Other examples are possible as well.

In line with the discussion above, in some implementations, the enterprise may use the scoped application to sign the one or more transactions. In particular, the scoped application may use a private key associated with the enterprise to generate a digital signature. The private key or other key used for generating a digital signature is different from the pre-shared key discussed herein.

In some examples, multiple transactions can be latched together and the digital signature can be generated for and associated with the batch, thus serving as a signing of the entire batch of transactions. In other examples, a digital signature can be generated for and associated with a respective representation of each individual transaction. In some implementations, the scoped application can be configured to encrypt transaction data with a pre-shared key only after the transaction data is signed. In other implementations, the scoped application can be configured to encrypt transaction data regardless of whether the transaction data is signed.

In some implementations, each transaction of the one or more transactions can be a transaction to which the enterprise is a party. However, it should be understood that one or more transactions could be a transaction to which the enterprise is not a party.

Further, the process can involve using the pre-shared key to encrypt the transaction data. As shown in FIG. 7, for instance, the transaction data that is encrypted can include four transactions. In other examples, more or less transactions are possible.

After the transaction data has been encrypted, the process can involve placing the encrypted representation into a data block 700. in line with the discussion above, blocks of the blockchain-based ledger 602 can be linked together by way of a hash chain To facilitate this, data block 700 can also include (i) a first output, such as a hash value, that is generated by applying a hash function to content from a previous block of the blockchain-based ledger 602 and (ii) a second output generated by applying the hash function to the encrypted transaction data and the first output. Thus, data block 700 can be linked to a previous block in the blockchain-based ledger, and a next block (not shown) that is added to the blockchain-based ledger, can be linked to data block 700.

FIG. 7 illustrates an example of this, As shown, the origin block of the blockchain-based ledger 602 contains Content A and Hash A. In the context of the present disclosure. Content A (and similarly, the respective content of each block in the blockchain-based ledger 602) can be transaction data. In line with the discussion above, Hash A can be generated by applying a hash function, f( ) to Content A, as shown by Equation 9 below.

$$f(\text{Content A}) = \text{Hash A} \qquad \text{Equation (9)}$$

As further shown, the next block contains Content B, Hash A, and Hash B. Hash B can be generated by applying the hash function to a concatenation of Content B and Hash A, as represented in Equation 10 below as "Content B+Hash A," where "+" denotes concatenation.

$$f(\text{Content B+Hash A}) = \text{Hash B} \qquad \text{Equation (10)}$$

As further shown, the next block contains Content C, Hash B, and Hash C. Hash C can be generated by applying the hash function to a concatenation of Content C and Hash B, as represented in Equation 11 below as "Content C+Hash B."

$$f(\text{Content C+Hash B}) = \text{Hash C} \qquad \text{Equation (11)}$$

As further shown, the next block, data block 700, contains Content D, Hash C, and Hash D. Hash D can be generated by applying the hash function to a concatenation of Content D and Hash C, as represented in Equation 12 below as "Content D Hash C."

$$f(\text{Content D+Hash C}) = \text{Hash B} \qquad \text{Equation (12)}$$

The process can then involve adding data block 700 to the blockchain-based ledger 602. As noted above, when a member writes a block, a copy of the block is distributed to blockchain-based ledgers within each computational instance of the trust group 600—namely, distributed to copies of blockchain-based ledger 602 stored by each computational instance of the trust group 600. For example, a copy of the block can be distributed to a copy of blockchain-based ledger 602 stored by computational instance 322, a copy of blockchain-based ledger 602 stored by computational instance 324, and a copy of blockchain-based ledger 602 stored by computational instance 326.

In some implementations, upon detecting that a copy of a block has been added to the blockchain-based ledger 602, computational instance 322 might automatically store transaction data contained within the block, or enable a user to select transaction data to store.

For example, the scoped application can be configured to obtain a copy of the block that was added to the blockchain-based ledger 602, decrypt the encrypted transaction data using a private key (e.g., a symmetric pre-shared key, or a private key that corresponds to the pre-shared key of an asymmetric key pair), and then provide a user with an interface for selecting which transaction data of the block to store. Additionally or alternatively, the scoped application can be configured to parse the transaction data and recommend to the user which transaction data to store.

As another example, the scoped application can be configured to obtain a copy of the block that was added to the blockchain-based ledger 602, decrypt the encrypted transaction data using a private key, and then provide at least a portion of the transaction data to a database or databases associated with one or more scoped applications executable on a computing device of computational instance 322, such as the scoped application that performs the process described above, or a different scoped application. As a more particular example, the scoped application can be a software asset management application and the block might include transaction data relating to one or more software entitlement contracts. In this example, when the block is added to the blockchain-based ledger 602, the software asset management application can provide some or all of the transaction data (e.g., license details, such as a duration of one or more licenses, a software publisher for each licensed software, and a cost for each license) from the block to database records managed by the software asset management application. Other examples are possible as well.

A scoped application configured to facilitate storage of newly-added transaction data to the blockchain-based ledger 602 in these and/or other manners can advantageously speed up the process of storing records of transaction data and reduce manual effort in storing such records.

Figure 8:
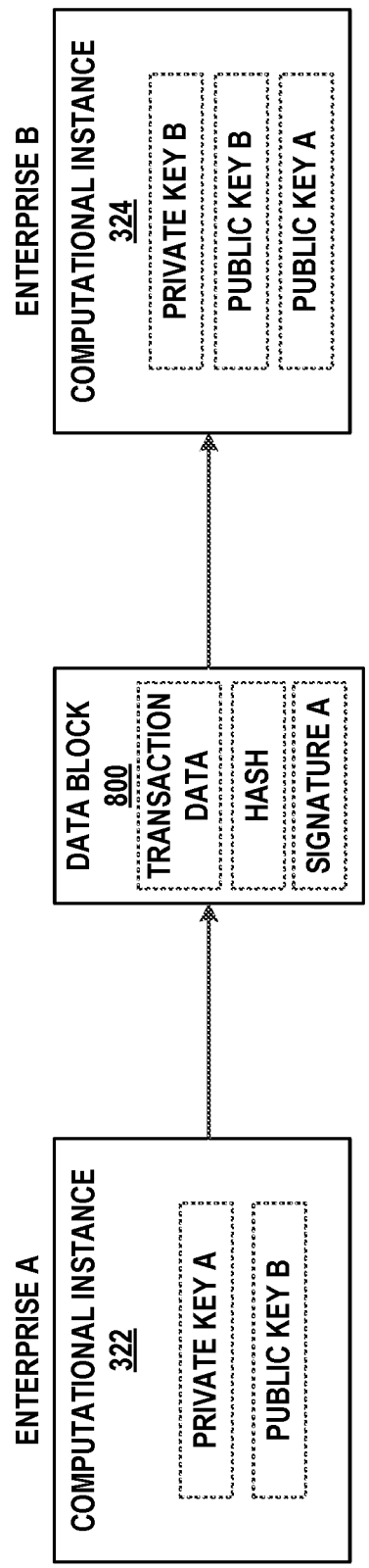
FIG. 8 illustrates an example scenario in which transaction data is shared with a member of a trust group, in accordance with example embodiments.

FIG. 8 illustrates an example scenario in which transaction data is shared with a member of trust group 600. As shown, computational instance 322 is associated with Enterprise A and computational instance 324 is associated with Enterprise B. For the sake of example, Enterprise A could be a software publisher in this scenario, and Enterprise B could be an enterprise customer of the software publisher. Other examples are possible as well. For instance, Enterprise A could be an enterprise seeking to send enterprise or employee identification information to an insurance provider, Enterprise B. As another example, Enterprise A could be a health care institution that seeks to send patient records to another health care institution, Enterprise B. And as another example, Enterprise A could be an enterprise that seeks to share transactions with an auditor: Enterprise B.

As further shown, computational instance 322 has stored or otherwise has access to Enterprise A's private key, Private Key A, and (ii) Enterprise B's public key, Public Key B. And computational instance 324 has stored or otherwise has access to (i) Enterprise B's private key, Private Key B, (ii) Public Key B, and (iii) Enterprise A's public key, Public Key A.

In this example scenario, Public Key B serves as the pre-shared key, In other scenarios, however, the pre-shared key could alternatively be a symmetric private key as described above.

When Enterprises A and. B engage in a transaction, such as a software entitlement contract, Enterprise A can use Private Key A to sign transaction data representing the transaction and then encrypt the transaction data and the digital signature (i.e., Signature A, as shown) using Public Key B. The transaction data is then placed into data block 800. Data block 800 can also include a header (not shown) representing a hash of a previous block, assuming data block 800 is not the origin block of the blockchain-based ledger 602. Data block SOO can then be hashed to generate a hash, and that hash is included in data block 800 as well. A copy of data block 800 can then be distributed to Enterprise B. Enterprise B can then decrypt data block 800, and thus decrypt the encrypted transaction data, using Private Key B.

In addition, Enterprise B can verify the hash of data block 800 to confirm the validity of the transaction data of data block 800. Further, because Enterprise B has access to Public Key A, Enterprise B can use Public Key A to verify that Enterprise A signed the transaction data.

When a member seeks to share transaction data with multiple other members of the trust group 600, this can be accomplished in various ways. For example, as discussed above, a symmetric private key could be generated for the trust group 600 and dedicated for use with the blockchain-based ledger 602. Each member with access to the symmetric private key can thus decrypt and view transaction data in the blockchain-based ledger 602.

In other implementations, one member can encrypt the transaction data using the member's private key of the other members. For instance, a first member can encrypt the transaction data using the first member's private key and can provide a second member and a third member with the first member's public key so that each of the second and third members can decrypt and view transaction data in the blockchain-based ledger 602. To facilitate this, for example, a central computational instance may function as a certificate authority as described above, and the first member, through the scoped application, can communicate with the central computational instance to give permission to the second and third members to be able to access the first member's public key, such as by transmitting an instruction to the central computational instance to give such permission to the second and third members. The central computational instance may then transmit the first member's public key to the second and third members or otherwise enable the second and third members to access the first member's public key via the respective computational instances of the second and third members. In another example, the first member can provide the second and third members with the first member's public key without using a central computational instance. Other examples are possible as well.

In other implementations, one member can encrypt multiple copies of the transaction data using the respective public keys of the other members. For instance, a first member can encrypt a first copy of the transaction data using a public key associated with a second member and also encrypt a second copy of the transaction data using a public key associated with a third member. In this scenario, the first member could then place each copy into a respective block, thus adding two blocks to the blockchain-based ledger 602: one that the second party can decrypt and view; and another that the third party can decrypt and view, Alternatively, the first copy of the transaction data could be placed into a first block and the first block can be distributed to the second member, and the second copy of the transaction data could be placed into a second block and the second block can be distributed to the third member. This, in effect, could create two copies of the blockchain-based ledger 602: one that is stored at a computational instance associated with the second member and that is encrypted with the second member's public key, and another that is stored at a computational instance associated with the third and that is encrypted with the third member's public key. Other examples are possible as well.

Figure 9:
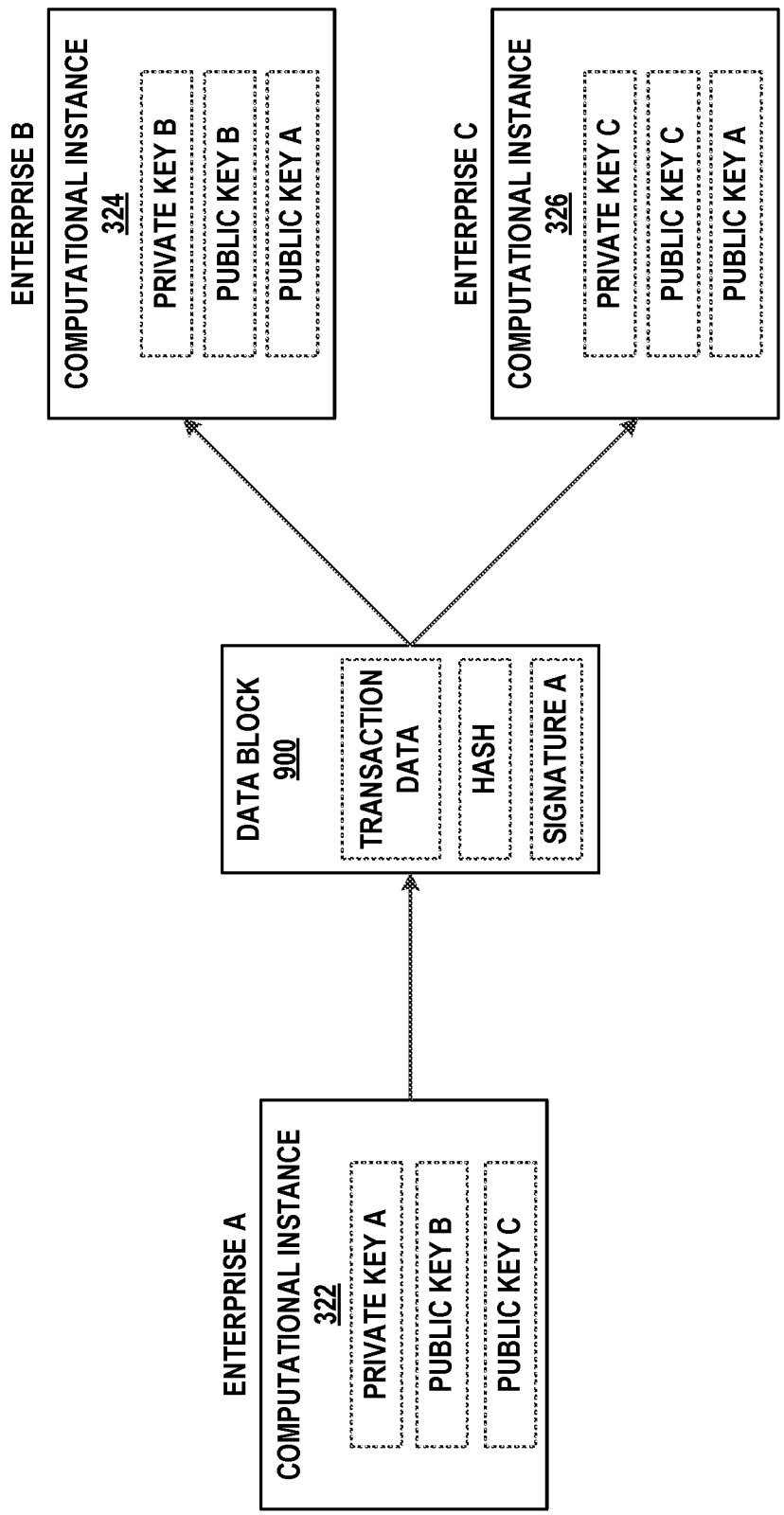
FIG. 9 illustrates an example scenario in which transaction data is shared with multiple members of a trust group, in accordance with example embodiments.

FIG. 9 illustrates an example scenario in which transaction data is shared with multiple members of trust group 600 so that more than one member can decrypt and view the transaction data.

As shown, computational instance 322 is associated with Enterprise A, computational instance 324 is associated with Enterprise B, and computational instance 326 is associated with Enterprise C. For the sake of example, Enterprise A could be an enterprise that seeks to share transactions with two different auditors: Enterprise B and Enterprise C. Other examples are possible as well.

As further shown, computational instance 322 has stored or otherwise has access to (i) Enterprise A's private key, Private Key A, (ii) Enterprise B's public key, Public Key B, and (iii) Enterprise C's public key, Public Key C. In addition, computational instance 324 has stored or otherwise has access to (i) Enterprise B's private key, Private Key B, (ii) Public Key B, and (iii) Enterprise A's public key, Public Key A. And computational instance 326 has stored or otherwise has access to (i) Enterprise C's private key, Private Key C, (ii) Public Key C, and (iii) Enterprise A's public key, Public Key A.

In scenarios such as this where the pre-shared key is a public key of an asymmetric key pair, each public key used to encrypt the transaction data serves as a pre-shared key.

In the example scenario shown in FIG. 9, for instance, there are two pre-shared keys: Public Key B and Public Key C. When Enterprise A seeks to share transaction data with Enterprises B and C, Enterprise A can use Private Key A to sign the transaction data, encrypt one copy of the transaction data with Public Key B, and encrypt another copy of the transaction data with Public Key C. The copy of the transaction data encrypted with Public Key B can be placed into one copy of data block 900, and the copy of the transaction data encrypted with :Public Key C can be placed into another copy of data block 900. Each copy of data block 900 can also include a header (not shown) representing a hash of a previous block, assuming data block 900 is not the origin block of the blockchain-based ledger 602. Each copy of data block 900 can then be hashed to generate a hash, and that hash is included in each copy of data block 900 as well. The copies of data block 900 can then be distributed to Enterprise B and Enterprise C accordingly, and each of the enterprises can decrypt the transaction data using their respective private keys. Further, because each of Enterprise B and Enterprise C has access to Public Key A, Enterprise B and Enterprise C can use Public Key A to verify that Enterprise A signed the transaction data.

In an example scenario, at one point in time, only Enterprise A and. Enterprise B might be in the trust group 600, and thus only Enterprise B might be able to view the blockchain-based ledger 602 (e.g., blocks of the blockchain-based ledger 602 are encrypted with Public Key B). For instance, this scenario might occur where Enterprise B is an auditor for Enterprise A. At a later point in time, Enterprise C might join the trust group 600, and thus a copy of the blockchain-based ledger 602 can be stored at a computational instance associated with Enterprise C, although only Enterprise B is able to view the blockchain-based ledger 602. If Enterprise A seeks to transfer read permissions from Enterprise B to Enterprise C, historical transaction data that was stored in the blockchain-based ledger 602 before Enterprise C was granted read permissions can be copied, the copy can be re-encrypted using Public Key C and/or re-signed with Enterprise C's digital signature, and then the copy can be stored. Then, Enterprise B might no longer be able to view the transaction data stored in the blockchain-based ledger 602.

VII. Example Operations

Figure 10:
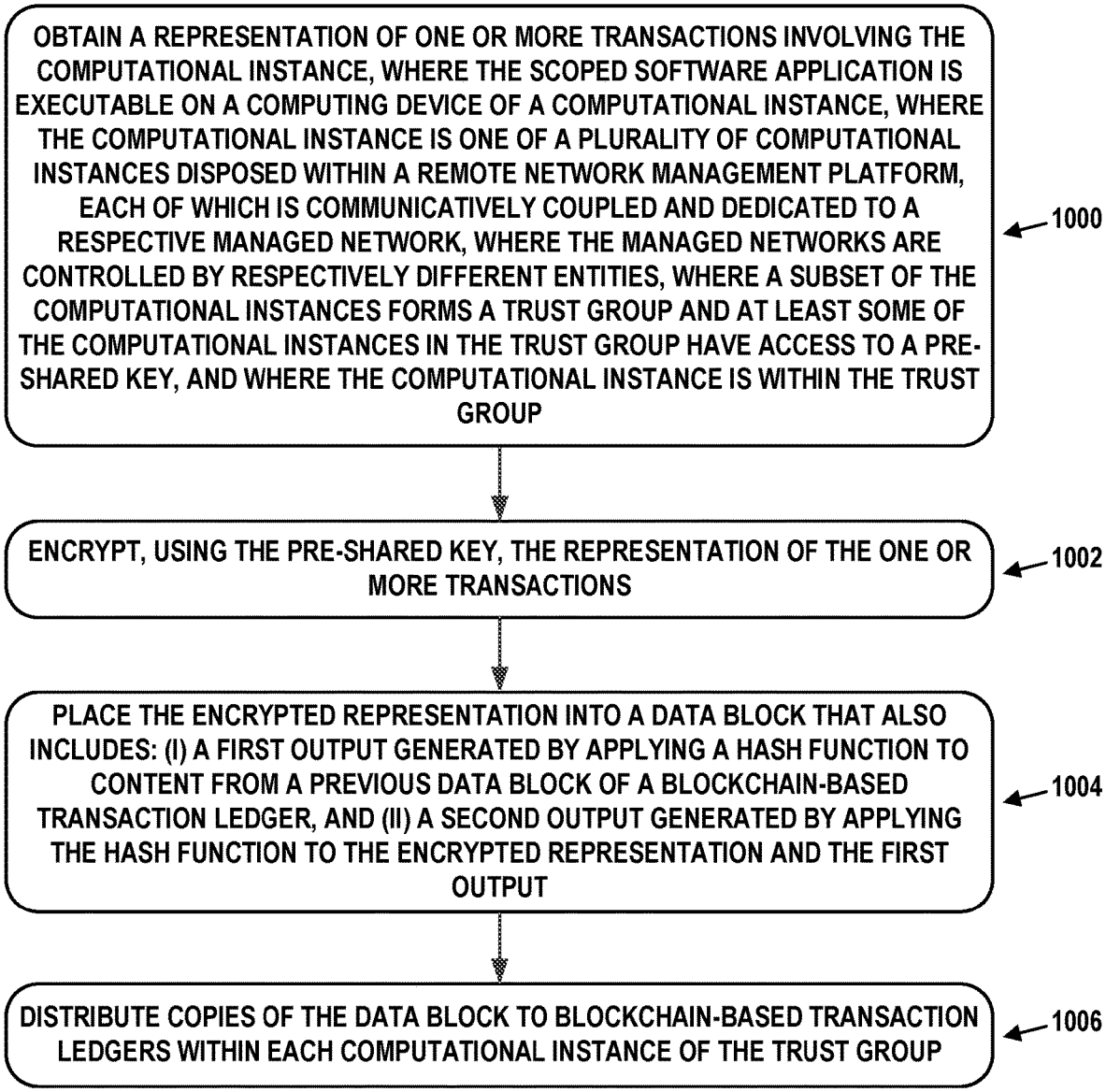
FIG. 10 is a flow chart, in accordance with example embodiments.

FIG. 10 is a flow chart illustrating an example embodiment. The process illustrated by FIG. 10 may be carried out by a computing device, such as computing device 100, a computational instance, such as computational instance 322, 324, or 326, a scoped software application, and/or a cluster of computing devices, such as server cluster 200. For the purposes of example, the process illustrated by FIG. 10 will be described as being carried out by a scoped software application. However, the process can be carried out by other types of devices, applications, or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

In FIG. 10, block 1000 involves obtaining a representation of one or more transactions involving a computational instance. The scoped software application may be executable on a computing device of a computational instance. The computational instance may be one of a plurality of computational instances disposed within a remote network management platform, each of which is communicatively coupled and dedicated to a respective managed network. The managed networks may be controlled by respectively different entities. A subset of the computational instances may form a trust group and at least some of the computational instances in the trust group have access to a pre-shared key. And the computational instance may be within the trust group.

Block 1002 involves encrypting, using the pre-shared key, the representation of the one or more transactions.

Block 1004 involves placing the encrypted representation into a data block that also includes: (i) a first output generated by applying a hash function to content from a previous data block of a blockchain-based transaction ledger, and (ii) a second output generated by applying the hash function to the encrypted representation and the first output.

Block 1006 involves distributing copies of the data block to blockchain-based transaction ledgers within each computational instance of the trust group.

In some embodiments, the pre-shared key may be a symmetric key.

In some embodiments, the pre-shared key may be an asymmetric public key of an asymmetric key pair comprising the asymmetric public key and an asymmetric private key corresponding to the asymmetric public key.

In some embodiments, the above-described process may further involve determining that a copy of a second data block has been added to a blockchain-based transaction ledger within the computational instance, where the second data block may include an encrypted representation of one or more other transactions. In such embodiments, the above-described process may still further involve, in response to determining that the copy of the second data block has been added to the blockchain-based transaction ledger within the computational instance: decrypting the encrypted representation of the one or more other transactions and storing the decrypted representation of the one or more other transactions in a database associated with the scoped application.

In some embodiments, the scoped software application may be a software asset management application. The trust group may be a software license contract trust group including the computational instance and a second computational instance. The computational instance may be associated with a software publisher and the second computational instance may be associated with an enterprise obtaining software from the software publisher. The one or more transactions may include a software license contract between the software publisher and the enterprise. The pre-shared key may be an asymmetric public key associated with the second computational instance. In such embodiments, the act of distributing copies of the data block to the blockchain-based transaction ledgers within each computational instance of the trust group may involve distributing copies of the data block to the blockchain-based transaction ledgers within each computational instance of the software license contract trust group.

Further, in such embodiments, the above-described process may involve determining that a copy of a second data block has been added to a blockchain-based transaction ledger within the computational instance, where the second data block may include an encrypted representation of one or more other transactions. Still further, the above-described process may involve, in response to determining that the copy of the second data block has been added to the blockchain-based transaction ledger within the computational instance: decrypting the encrypted representation of the one or more other transactions and updating, based on the decrypted representation of the one or more other transactions, software entitlement records stored in a database associated with the scoped software application.

In some embodiments, the trust group may be an auditing trust group including the computational instance, a second computational instance, and a third computational instance, where the second computational instance and the third computational instance are each associated with a respective auditor of transactions involving the computational instance. In such embodiments, the act of encrypting the representation of the one or more transactions using the pre-shared key may involve (i) encrypting, using a first asymmetric public key associated with the second computational instance, the representation of the one or more transactions to generate a first encrypted representation of the one or more transactions and (ii) encrypting, using a second asymmetric public key associated with the third computational instance, the representation of the one or more transactions to generate a second encrypted representation of the one or more transactions. Further, in such embodiments, the act of distributing copies of the data block to the blockchain-based transaction ledgers within each computational instance of the trust group might involve distributing, to a first blockchain-based ledger within the second computational instance, a first copy of the data block including the first encrypted representation, and distributing, to a second blockchain-based ledger within the third computational instance, a second copy of the data block including the second encrypted representation.

In some embodiments, the above-described process may involve before encrypting the representation of the one or more transactions using the pre-shared key, generating, using an asymmetric private key of an asymmetric key pair that includes an asymmetric public key corresponding to the asymmetric private key and does not include the pre-shared key, a digital signature for at least one of the one or more transactions. In such embodiments, the act of encrypting the representation of the one or more transactions using the pre-shared key may involve encrypting, using the pre-shared key, the digital signature and the representation of the one or more transactions. The asymmetric public key may be accessible to one or more computational instances in the trust group and may enable the one or more computational instances in the trust group to verify that the digital signature was performed using the asymmetric private key.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    a plurality of computational instances disposed within a remote network management platform, each of which is communicatively coupled and dedicated to a respective managed network, wherein the managed networks are controlled by respective different entities, and wherein a subset of the computational instances forms a trust group and at least some of the computational instances in the trust group have access to a pre-shared key; and
    a scoped software application, executable on a computing device of a computational instance within the trust group, and configured to:
        receive an input that identifies the different entities within the trust group and enables one of the entities with administrative permission to control, via the scoped software application, which computational instances of the subset of the computational instances have access to the pre-shared key;
        obtain a representation of one or more transactions involving the computational instance;
        encrypt, using the pre-shared key, the representation of the one or more transactions;
        place the encrypted representation into a data block that also includes: (i) a first hash of content from a previous data block of a blockchain-based transaction ledger, and (ii) a second hash of the encrypted representation and the first hash; and
        distribute copies of the data block to blockchain-based transaction ledgers within each computational instance of the trust group.

2. The system of claim 1, wherein the pre-shared key is a symmetric key.

3. The system of claim 1, wherein the pre-shared key is an asymmetric public key of an asymmetric key pair comprising the asymmetric public key and an asymmetric private key corresponding to the asymmetric public key.

4. The system of claim 1, wherein the scoped software application is configured to:
    determine that a copy of a second data block has been added to a blockchain-based transaction ledger within the computational instance, wherein the second data block includes an encrypted representation of one or more other transactions; and
    in response to determining that the copy of the second data block has been added to the blockchain-based transaction ledger within the computational instance:
        decrypt the encrypted representation of the one or more other transactions; and
        store the decrypted representation of the one or more other transactions in a database associated with the scoped software application.

5. The system of claim 1, wherein the scoped software application is a software asset management application,
    wherein the trust group is a software license contract trust group including the computational instance and a second computational instance,
    wherein the computational instance is associated with a software publisher and the second computational instance is associated with an enterprise obtaining software from the software publisher,
    wherein the one or more transactions include a software license contract between the software publisher and the enterprise,
    wherein the pre-shared key is an asymmetric public key associated with the second computational instance, and
    wherein distributing copies of the data block to the blockchain-based transaction ledgers within each computational instance of the trust group comprises distributing copies of the data block to the blockchain-based transaction ledgers within each computational instance of the software license contract trust group.

6. The system of claim 5, wherein the scoped software application is configured to:
    determine that a copy of a second data block has been added to a blockchain-based transaction ledger within the computational instance, wherein the second data block includes an encrypted representation of one or more other transactions; and
    in response to determining that the copy of the second data block has been added to the blockchain-based transaction ledger within the computational instance:
        decrypt the encrypted representation of the one or more other transactions; and
        update, based on the decrypted representation of the one or more other transactions, software entitlement records stored in a database associated with the scoped software application.

7. The system of claim 1, wherein the trust group is an auditing trust group including the computational instance, a second computational instance, and a third computational instance,
    wherein the second computational instance and the third computational instance are each associated with a respective auditor of transactions involving the computational instance,
    wherein encrypting the representation of the one or more transactions using the pre-shared key comprises (i) encrypting, using a first asymmetric public key associated with the second computational instance, the representation of the one or more transactions to generate a first encrypted representation of the one or more transactions and (ii) encrypting, using a second asymmetric public key associated with the third computational instance, the representation of the one or more transactions to generate a second encrypted representation of the one or more transactions, and
    wherein distributing copies of the data block to the blockchain-based transaction ledgers within each computational instance of the trust group comprises distributing, to a first blockchain-based ledger within the second computational instance, a first copy of the data block including the first encrypted representation, and distributing, to a second blockchain-based ledger within the third computational instance, a second copy of the data block including the second encrypted representation.

8. The system of claim 1, wherein the scoped software application is configured to:
before encrypting the representation of the one or more transactions using the pre-shared key, generate, using an asymmetric private key of an asymmetric key pair that includes an asymmetric public key corresponding to the asymmetric private key and does not include the pre-shared key, a digital signature for at least one of the one or more transactions,
wherein encrypting the representation of the one or more transactions using the pre-shared key comprises encrypting, using the pre-shared key, the digital signature and the representation of the one or more transactions, and
wherein the asymmetric public key is accessible to one or more computational instances in the trust group and enables the one or more computational instances in the trust group to verify that the digital signature was performed using the asymmetric private key.

9. A method comprising:
receiving, by a scoped software application, an input that identifies different entities within a trust group and enables one of the entities with administrative permission to control which computational instances of a subset of computational instances have access to a pre-shared key;
obtaining, by the scoped software application, a representation of one or more transactions involving a computational instance, wherein the scoped software application is executable on a computing device of the computational instance, wherein the computational instance is one of a plurality of the computational instances disposed within a remote network management platform, each of which is communicatively coupled and dedicated to a respective managed network, wherein the managed networks are controlled respectively by the different entities, wherein the subset of the computational instances forms the trust group and at least some of the computational instances in the trust group have access to the pre-shared key, and wherein the computational instance is within the trust group;
encrypting, by the scoped software application, using the pre-shared key, the representation of the one or more transactions;
placing, by the scoped software application, the encrypted representation into a data block that also includes: (i) a first hash of content from a previous data block of a blockchain-based transaction ledger, and (ii) a second hash of the encrypted representation and the first hash; and
distributing, by the scoped software application, copies of the data block to blockchain-based transaction ledgers within each computational instance of the trust group.

10. The method of claim 9, wherein the pre-shared key is a symmetric key.

11. The method of claim 9, wherein the pre-shared key is an asymmetric public key of an asymmetric key pair comprising the asymmetric public key and an asymmetric private key corresponding to the asymmetric public key.

12. The method of claim 9, comprising:
determining that a copy of a second data block has been added to a blockchain-based transaction ledger within the computational instance, wherein the second data block includes an encrypted representation of one or more other transactions; and
in response to determining that the copy of the second data block has been added to the blockchain-based transaction ledger within the computational instance:
decrypting the encrypted representation of the one or more other transactions; and
storing the decrypted representation of the one or more other transactions in a database associated with the scoped software application.

13. The method of claim 9, wherein the scoped software application is a software asset management application,
wherein the trust group is a software license contract trust group including the computational instance and a second computational instance,
wherein the computational instance is associated with a software publisher and the second computational instance is associated with an enterprise obtaining software from the software publisher,
wherein the one or more transactions include a software license contract between the software publisher and the enterprise,
wherein the pre-shared key is an asymmetric public key associated with the second computational instance, and
wherein distributing copies of the data block to the blockchain-based transaction ledgers within each computational instance of the trust group comprises distributing copies of the data block to the blockchain-based transaction ledgers within each computational instance of the software license contract trust group.

14. The method of claim 13, comprising:
determining that a copy of a second data block has been added to a blockchain-based transaction ledger within the computational instance, wherein the second data block includes an encrypted representation of one or more other transactions; and
in response to determining that the copy of the second data block has been added to the blockchain-based transaction ledger within the computational instance:
decrypting the encrypted representation of the one or more other transactions; and
updating, based on the decrypted representation of the one or more other transactions, software entitlement records stored in a database associated with the scoped software application.

15. The method of claim 9, wherein the trust group is an auditing trust group including the computational instance, a second computational instance, and a third computational instance,
wherein the second computational instance and the third computational instance are each associated with a respective auditor of transactions involving the computational instance,
wherein encrypting the representation of the one or more transactions using the pre-shared key comprises (i) encrypting, using a first asymmetric public key associated with the second computational instance, the representation of the one or more transactions to generate a first encrypted representation of the one or more transactions and (ii) encrypting, using a second asymmetric public key associated with the third computational instance, the representation of the one or more transactions to generate a second encrypted representation of the one or more transactions, and
wherein distributing copies of the data block to the blockchain-based transaction ledgers within each computational instance of the trust group comprises distributing, to a first blockchain-based ledger within the second computational instance, a first copy of the data block including the first encrypted representation, and distributing, to a second blockchain-based ledger within the third computational instance, a second copy of the data block including the second encrypted representation.

16. The method of claim 9, comprising:

before encrypting the representation of the one or more transactions using the pre-shared key, generating, using an asymmetric private key of an asymmetric key pair that includes an asymmetric public key corresponding to the asymmetric private key and does not include the pre-shared key, a digital signature for at least one of the one or more transactions, wherein encrypting the representation of the one or more transactions using the pre-shared key comprises encrypting, using the pre-shared key, the digital signature and the representation of the one or more transactions, and wherein the asymmetric public key is accessible to one or more computational instances in the trust group and enables the one or more computational instances in the trust group to verify that the digital signature was performed using the asymmetric private key.

17. An article of manufacture including a non-transitory computer-readable medium, having stored thereon program instructions that, upon execution by a computing device of a computational instance, cause the computing device to perform operations via a scoped software application, wherein the operations comprise:

receiving an input that identifies different entities within a trust group and enables one of the entities with administrative permission to control which computational instances of a subset of computational instances have access to a pre-shared key;

obtaining a representation of one or more transactions involving the computational instance, wherein the computational instance is one of a plurality of computational instances disposed within a remote network management platform, each of which is communicatively coupled and dedicated to a respective managed network, wherein the managed networks are controlled respectively by the different entities, wherein a subset of the computational instances forms the trust group and at least some of the computational instances in the trust group to have access to a pre-shared key, and wherein the computational instance is within the trust group;

encrypting, using the pre-shared key, the representation of the one or more transactions;

placing the encrypted representation into a data block that also includes: (i) a hash of content from a previous data block of a blockchain-based transaction ledger, and (ii) a second hash of encrypted representation and the first hash; and distributing copies of the data block to blockchain-based transaction ledgers within each computational instance of the trust group.

18. The article of manufacture of claim 17, wherein the pre-shared key is a symmetric key.

19. The article of manufacture of claim 17, wherein the pre-shared key is an asymmetric public key of an asymmetric key pair comprising the asymmetric public key and an asymmetric private key corresponding to the asymmetric public key.

20. The article of manufacture of claim 17, the operations comprising:

determining that a copy of a second data block has been added to a blockchain-based transaction ledger within the computational instance, wherein the second data block includes an encrypted representation of one or more other transactions; and in response to determining that the copy of the second data block has been added to the blockchain-based transaction ledger within the computational instance:

decrypting the encrypted representation of the one or more other transactions; and storing the decrypted representation of the one or more other transactions in a database.

* * * * *